United States Patent [19]
Jacobson

[11] Patent Number: 5,364,566
[45] Date of Patent: Nov. 15, 1994

[54] PROCESS FOR MAKING ELECTROCONDUCTIVE POWDERS

[75] Inventor: Howard W. Jacobson, Wilmington, Del.

[73] Assignee: E. I. Du Pont de Nemours and Company, Wilmington, Del.

[21] Appl. No.: 17,078

[22] Filed: Feb. 12, 1993

[51] Int. Cl.$^5$ .......................... H01B 1/00; H01B 1/06; H01B 1/08
[52] U.S. Cl. ..................... 252/518; 252/520; 252/521; 106/455; 106/441; 423/89
[58] Field of Search ............... 252/500, 518, 520, 521; 106/455, 441; 423/89

[56] References Cited

U.S. PATENT DOCUMENTS

| | | | |
|---|---|---|---|
| 4,775,412 | 10/1988 | Nishikura et al. | 75/0.5 |
| 4,917,952 | 4/1990 | Katamoto et al. | 428/403 |
| 5,068,063 | 11/1991 | Tremper, III | 252/518 |
| 5,071,676 | 12/1991 | Jacobson | 427/214 |
| 5,104,583 | 4/1992 | Richardson | 252/518 |
| 5,114,756 | 5/1992 | Mirabeau et al. | 427/379 |
| 5,192,613 | 3/1993 | Work, III et al. | 428/363 |

FOREIGN PATENT DOCUMENTS

| | | |
|---|---|---|
| 0359569 | 3/1990 | European Pat. Off. |
| 3842330 | 6/1990 | Germany |
| 62-216105 | 3/1986 | Japan |
| 61-063520 | 5/1986 | Japan |
| 62-269051 | 12/1989 | Japan |
| 4-62713 | 2/1992 | Japan |
| 2252551 | 8/1992 | United Kingdom |
| 2253839 | 9/1992 | United Kingdom |
| WO94/00851 | 1/1994 | WIPO |

OTHER PUBLICATIONS

Olah et al. "Superacids" John Wiley & Sons publication, New York pp. 1-10, 1985.
"Preparation and Properties of Antimony-Doped SnO$_2$ films by thermal decomposition of tin 2-ethylhexanoate", Tsunashima et al. pp. 2731-2735 1986.

Primary Examiner—Paul Lieberman
Assistant Examiner—M. Kopec
Attorney, Agent, or Firm—Michael K. Boyer

[57] ABSTRACT

A method for preparing a substantially white electroconductive powders by applying a surface coating comprising a two-dimensional network of antimony-containing tin oxide to amorphous silica or silica coated particles.

9 Claims, 1 Drawing Sheet

PROCESS FOR MAKING ELECTROCONDUCTIVE POWDERS

FIELD OF THE INVENTION

The present invention relates to a method for preparing substantially white electroconductive powders (ECP) comprising antimony-containing tin oxide wherein the composition exists in association with silica or a silica-containing material.

BACKGROUND OF THE INVENTION

Known ECP compositions and a process for preparing the known ECPs are described in European Patent Application Publication No. 0 359 569, entitled "Improved Electroconductive Composition and Process of Preparation", (which corresponds to U.S. patent application Ser. No. 07/386,765); the entire disclosure of which is hereby incorporated herein by reference. The known method for preparing ECP compositions comprises using a solution containing hydrolyzable tin and antimony salts, for example $SnCl_4$ and $SbCl_3$, having a pH in the range 1.5 and 3.5 to deposit a tin oxide surface coating which contains antimony. Conventionally, to obtain adequate electroconductivity the surface coating contained at least about 5 through about 10 wt % antimony.

SUMMARY OF THE INVENTION

The present invention relates to a method for preparing substantially white ECP compositions, and solving problems which are associated with known methods for making ECPs. The electroconductivity of the known ECP compositions decreases with increasing crystallite size, wherein the crystallite size decreases as the antimony content of the surface coating increases. At antimony levels of about 5 wt % based on the tin oxide the coating has a blue grey color, and the color becomes deep blue as the antimony content is increased. In many applications, for example, a conductive pigment in paint, it would be preferable for the ECP composition to be free from color. This can be achieved by the process disclosed in the aforementioned publication provided that the antimony component of the coating is less than about 3 wt % based on the tin oxide. When reducing the antimony content of the ECP, however, the electroconductivity of the known ECP product may fall to an unacceptably low level.

By using the method of the invention it is possible to produce substantially color free or white ECPs while maintaining a high level of electroconductivity. In order to best achieve such properties, the pH of the aqueous solution, which contains a source of antimony and tin, is adjusted to range between about −0.5 to about −1.0. For example, the pH can be adjusted by adding concentrated acids such as at least one member of the group of HCl, $HNO_3$, $H_2SO_4$, among others. The pH of the aqueous solution permits obtaining ECPs which have a desirable electroconductivity, are substantially white or free from color, and contain relatively low amounts of antimony.

The ECP compositions prepared by the method of the invention include substrate particles comprising amorphous silica and/or a silica-containing material, that range in size from tens of microns to sub-micron size, which are in association with a surface coating or layer. The surface coating comprises an electroconducting network of antimony-containing tin oxide crystallites wherein the quantity of antimony, which is used to obtain electroconductivity, is reduced in comparison to conventional ECPs.

DETAILED DESCRIPTION

Figure 1:
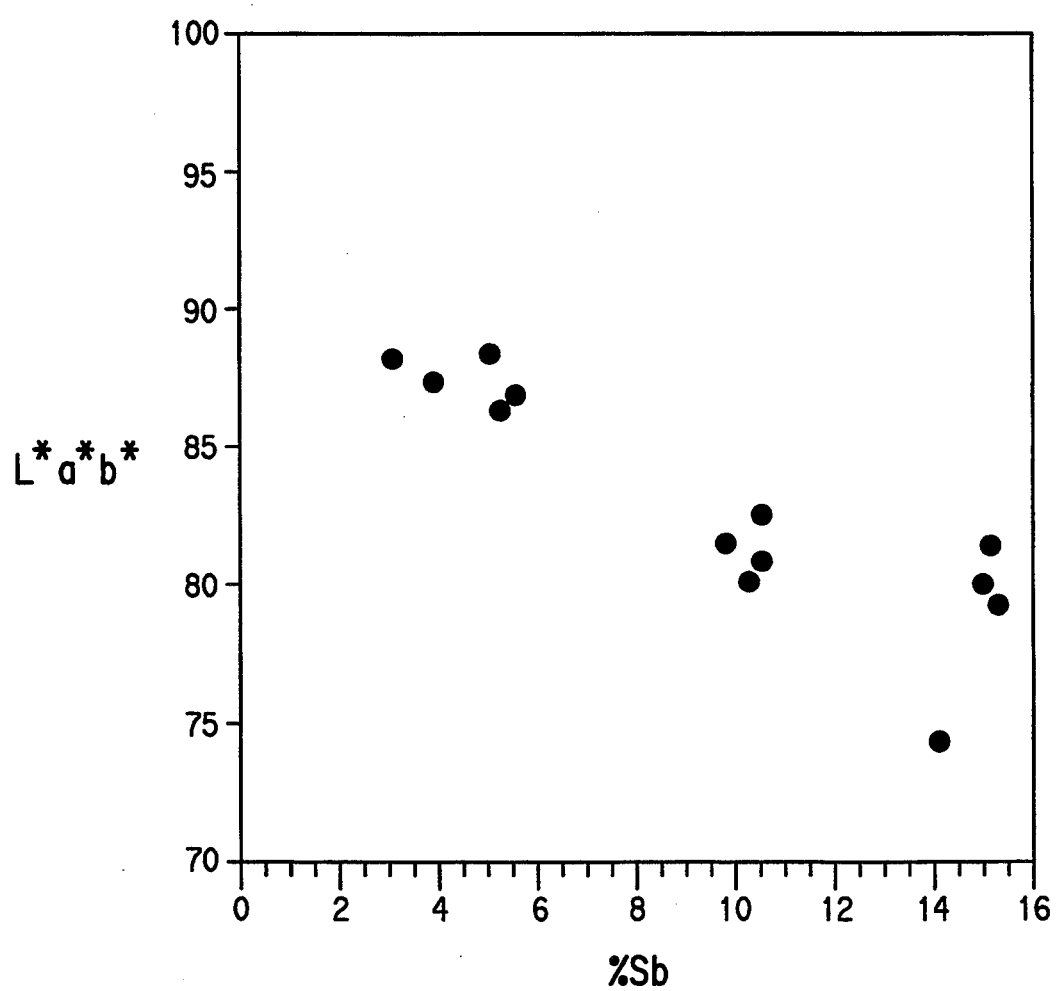
FIG. 1 is a plot of wt. % antimony versus L*a*b* for an ECP which can be produced in accordance with the present invention.

The present invention relates to a method for preparing substantially white ECPs having relatively high electroconductivity.

The term "color-free", "substantially white" or "pure white" is meant to refer to the color characteristics of an ECP which can be formed by the present invention. One way to determine the color or whiteness of an ECP is by measuring the powder's reflectivity as a function of three coordinates, namely, "L", "a", and "b". The "L" coordinate refers to the lightness or darkness of an ECP, wherein an "L" value of 100 refers to pure or true white and 0 being black. The "a" and "b" coordinates refer to chroma characteristics. A positive value for "a" indicates the presence of red, and a negative "a" value indicates the presence of green. A positive value for "b" indicates the presence of "yellow", and a negative value for "b" indicates the presence of blue. In the present case, the ECPs have a reflectance of visible light or whiteness which ranges from about 80 to at least about 95%, normally at least about 82%.

The compositions prepared by the method of the invention comprise a two-dimensional network of tin oxide crystallites containing about 0.5 to about 3 wt % of antimony which are in association with amorphous silica or with a silica-containing substrate material. By the phrase "association with" it is meant that antimony-containing tin oxide crystallites are adhered or bonded to at least a portion of a substrate surface comprising amorphous hydroxylates silica and/or a silica-containing material. In some cases, the association may be in the form of a distinct coating or layer, a mixed oxide at the crystallite/surface interface, among others. Without wishing to be bound by any theory or explanation, it is believed that the antimony component of the crystallites becomes substituted for certain tin atoms in the tin oxide crystalline lattice, thereby rendering the crystallites electroconductive. The crystallites may not completely surround the substrate; but rather, in some cases may form an at least partially interconnected network about at least a portion the substrate's surface.

The ECP compositions, in the form of finely divided particles, are uniquely capable of forming an interconnecting conductive network when incorporated, for example, as a component within a polymeric carrier matrix, or a solution which is applied upon a surface as a thin film. The carrier matrix may take any of a variety of forms including films, fibers, among many other forms. The substantial absence of color in the ECP composition made by the process of the invention is desirable in many applications such as a conductive pigment in metal primers for use in the automobile industry, wherein the presence of color would limit the choice of finish coat shades. The ECPs of the invention may also be employed to obtain an electroconductive paper or plastic film. An example of such an ECP containing film is described in European Patent Publication No. 0 439 161, entitled "Electrographic Recording Element with Reduced Humidity Sensitivity" (which corresponds to U.S. patent application Ser. No. 07/620,251); the entire disclosure of which is hereby incorporated by reference.

The method described in the above-incorporated European Patent Application Publication No. 0 359 569 (hereinafter referred to as "EPO 569"), for preparing ECPs includes depositing a thin coating comprising antimony-containing tin oxide onto a silica substrate, e.g., an amorphous hydroxylated silica or a silica-containing particulate material. This deposition step comprises adding a solution containing hydrolyzable tin and antimony salts, for example, $SnCl_4$ and $SbCl_3$, in a desired ratio into an agitated suspension of particulate substrates, concurrently with a strong alkali while maintaining the pH of the suspension in the range of about 1.5 and 3.5. The deposition step coats antimony and tin hydrous oxides upon at least a portion of the surface of the substrate. Adequate calcination of the coated substrate produces an electroconductive network of antimony-containing tin oxide crystallites.

The phrase "amorphous hydroxylated silica or a silica-containing material" as used herein means materials having a surface composed of an extensive network involving $SiO_4$ tetrahedra. Such compositions offer the potential for surface hydroxyl formation, a feature which may be important in a chemical interaction between silica or a silica containing substrate and the aqueous solution of tin and antimony salts that may be used in forming the compositions of this invention. Suitable substrate compositions and methods for their preparation are described in EPO '569; the teachings of which have been incorporated herein by reference. Examples of suitable substrate compositions comprise at least one member from the group comprising amorphous silica coated titanium oxide; amorphous silica coated calcium, barium, or strontium carbonate, sulfate or oxide, the oxides of zinc, tin, nickel, and iron; amorphous silica coated mica; among others. In some cases, the silica-containing material may comprise a hollow silica shell that was made substantially in accordance with the method described in U.S. Pat. No. 5,024,826, entitled "Silica Particulate Composition"; the entire disclosure of which is hereby incorporated by reference. In another case, the silica-containing material may comprise a mixture of one or more physically or chemically distinct types of suitable substrate compositions.

The average size and shape of the ECPs, which can be formed by the invention, are controlled by the configuration of the substrates. The particle size of the substrate typically ranges from submicron to tens of microns; normally about 0.1 to about 20 microns. By appropriately selecting the substrate material upon which the antimony-containing tin oxide is deposited, the characteristics of the powder can be tailored to satisfy a wide range of end-use applications.

A key step in the process of the present invention relates to the environment which is employed to apply the surface coating of antimony-containing tin oxide upon the substrates. This step comprises treating an agitated aqueous suspension of substrate particles at a temperature in the range of about 25° to 100° C. with a solution comprising a source of tin and antimony such as hydrolyzable salts of tin and antimony, e.g., $SnCl_4$ and $SbCl_3$. The substrate suspension as well as the salt solution can be prepared in the manner described in EPO '569. The molar ratio of hydrolyzable salts, e.g., $SnCl_4/SbCl_3$, in the solution to be added to the suspension of substrate particles is typically between about 100/3 and 100/0.5, and the quantity of substrate particles typically ranges from about 100 to about 400 g/l. Before adding the salt solution to the particulate suspension, the pH of the salt solution is adjusted to range between about −0.5 and −1.0 by adding a concentrated acid, e.g., HCl. For best results, a sodium hydroxide solution is added concurrently with the $SnCl_4/SbCl_3$/acid solution to the particulate suspension, while maintaining the pH in the mixing zone between about 1.5 and about 3.5. Normally, the sodium hydroxide solution and the $SnCl_4/SbCl_3$/acid solution are introduced into the suspension of substrate particles by being injected into a vigorously agitated mixing zone of the suspension at a precisely monitored rate, e.g., at the rate described in EPO '569. When the addition of reactants is completed, the suspension is agitated further while maintaining the temperature of the suspension in the range of about 25° and 100° C. for a period of between about half an hour and about one hour to cure the antimony-containing tin oxide surface coating. By "cure" it is meant that the antimony-containing tin hydrous oxide crystallites are sufficiently adhered or bonded to the substrate particles such that the coated substrate particles can have utility as ECPs.

The layer comprising or consisting essentially of antimony-containing tin oxide crystallites is typically about 5 to 20 nm in thickness, and is in association with an underlying particle or substrate, wherein the layer covers at least a portion of the surface of the substrate. The substrate typically has major dimensions that are ten to ten thousand times as large as the thickness of the tin oxide layer. In most case, the crystallites can be described as a substantially continuous conducting layer in two dimensions about the surface of the substrate. Typically, the antimony-containing tin oxide crystallites range in size from about 50 to about 100 Angstroms.

For best results, a cation or mixture of cations selected from Groups IA, IIA or IIIA metals is present during the previously discussed antimony-containing tin oxide deposition step. These cations may be introduced as soluble salts, e.g., chlorides, nitrates, sulfates, among others, and/or the cations may be present within the aqueous phase of the substrate suspension. The latter case typically occurs when the substrate comprises a silica shell wherein a core material such as $CaCO_3$ or $BaCO_3$ has been dissolved by using an acid medium, e.g., HCl, $HNO_3$, among others. For example, when depositing an antimony-containing tin oxide layer upon a silica surface, e.g., a hydroxylated silica surface, the presence of at least one suitable cation typically induces formation of a layer containing crystallites which are less than about 100 angstroms in size. Group IIA metal cations are useful for this purpose with calcium and barium being particularly desirable. Typically, the presence of such cations at concentrations from about 0.1M to about 3.0M, normally from 1.0M to 2.0M, is desirable from the standpoint of obtaining a coherent, adhered or bonded coating comprising antimony-containing tin oxide crystallites.

The coated substrates are then isolated by using any convenient solid-liquid separation procedure, usually washed with deionized water until substantially free from soluble species, and calcined, for example, in air such as is described in EPO '569. Suitable calcination temperatures range from about 550° to about 900° C.; normally at least about 600° C. By controlling the calcination temperature, the resistance of the ECP can be tailored to satisfy a particular end use. Typically, as the calcination temperature increases the dry powder resistance of the ECP tends to decrease. For example, a dry ECP having antimony-containing tin oxide (about 10% $Sb_2O_3$ based upon $SnO_2$), crystallites of about 60 angstroms, which had a calcination temperature of about 200° C., possessed a dry powder resistance of about 50,000 ohms; whereas another dry ECP powder, which contained a similar quantity of antimony and had antimony-containing tin oxide crystallites of about 78 angstroms, that had a calcination temperature of about 750° C., possessed a dry powder resistance of about 12 ohms.

The testing procedures that can be used to characterize the ECP prepared by the method of this invention are described in detail in EPO '569.

The dry powder resistance of the ECP product made by the present invention was measured in a dry powder cell substantially in the manner disclosed in EPO '569, and typically ranges from about 10 to at least about 2000 ohms; normally about 10–100 ohms.

The ECP prepared by the method of this invention when used in paint primer systems at pigment to binder ratios ("P/B"), of about 10/200 to 200/100, and normally about 25/100 to 100/100 parts by weight, can produce a substantially pure white dry film which has a Ransburg Number greater than about 140. The dry film can be formed and Ransburg Number measured substantially in accordance with the technique described in EPO '569. Such paint systems can be applied by any suitable technique to surfaces such as plastics, metals, among others. The following Table illustrates the performance in terms of Ransberg Readings of an ECP in a dried paint film as a function of Sb content.

| % $Sb_2O_3$ ($SnO_2$) | RANSBURG READING | | |
| --- | --- | --- | --- |
| | 48 P/B | 25 P/B | 18 P/B |
| 10 | 165 | 165 | 160 |
| 5 | 165 | 165 | 150 |
| 2.5 | 165 | 150 | 140 |
| 1.0 | 165 | 150 | 140 |

The surface roughness of the paint films, which incorporate the present ECPs (measured by using a Hobson-Taylor Surtronic 3 surface roughness tester supplied by G. F. Maier Co., Edgemont, Pa.), is in the range about 3 to 20 microinches; normally about 3 to 70 microinches.

The invention is described in greater detail in the following examples which should not be construed as limiting in any way the scope of the invention.

EXAMPLE 1

This example describes a process for preparing a substantially white transparent electroconductive powder (TECP) comprising hollow shell amorphous silica particles coated with crystallites of antimony-containing tin oxide, wherein the weight ratio of $SnO_2$ to Sb in the coating is about 58 to 1.

Into two liters of deionized water, which had been heated to about 90° C. in a four liter beaker were added, with agitation, about 2 grams of triethanolamine and about 200 grams of micronized $CaCO_3$ (supplied under the trademark "H.O. Dry Albacar"). The pH of the suspension was brought to about 9.5 by adding 20% NaOH. Approximately two hundred grams of a stock solution comprising $K_2SiO_3$ having an $SiO_2/K_2O$ molar ratio of about 3.29, and containing about 26.5 wt % $SiO_2$, was added to the suspension over a period of about two hours, while maintaining the pH of the suspension at about 9.5 by the controlled concurrent addition of 20% HCl. The pH of the suspension was then adjusted within the range about 8.5 to 9, and the agitated suspension was cured for about 30 minutes at a temperature of about 90° C. A small sample of the suspension was taken, and the dry solids, which comprised silica coated $CaCO_3$ particles, were recovered for surface area measurement. The surface area was measured by a conventional BET method, and was found to be about 10.8 m2/g.

Approximately three hundred and forty ml of concentrated HCl was slowly added to the agitated suspension in order to dissolve the $CaCO_3$ core material, and the pH was stabilized at 2.0. The resultant suspension comprised hollow silica shells.

Next, an aqueous solution comprising $SnCl_4$, $SbCl_3$ and HCl was prepared by combining about 380 ml of an aqueous $SnCl_4$ solution, containing the equivalent of about 0.386 g $SnO_2$/ml, with about 7 ml of an aqueous concentrated HCl solution of $SbCl_3$, containing the equivalent of about 0.267 g Sb/ml. The resultant aqueous solution corresponded to a ratio of about 78 parts by weight of $SnO_2$ to 1 part by weight of Sb. Approximately one hundred and fifty ml of concentrated HCl was then added to the previous described aqueous solution to obtain a pH between about $-0.5$ to $-1.0$. The resultant solution was then added to the well agitated suspension of silica shell particles, over a period of about 2 hours, concurrently with the addition of a sufficient quantity of 20% NaOH to maintain the pH of the suspension at about 2.0. The suspension was then continuously agitated and cured by digesting for about half an hour at a pH of about 2.0, and a temperature of about 90° C.

The solids were recovered from the suspension by filtration, washed with deionized water until substantially free from chloride ions, and dried overnight at a temperature of about 120° C. The surface area of the dried powder was measured by a conventional BET method, and determined to be about 151.9 m2/g. The dried powder was calcined in air at a temperature of about 900° C. for a period of about 2 hours. Approximately 176.3 grams of a white powder was recovered which had a surface area of about 43.9 m2/g. The dry resistance of the calcined powder was measured in a dry powder conductivity cell, and determined to be about 1375 ohms. X-ray fluorescence analysis of the calcined powder indicated the presence of about 31.37% $SiO_2$; 65.91% $SnO_2$; 1.35% $Sb_2O_3$; 0.19% CaO; 0.11% $Fe_2O_3$; and <0.02% BaO. This corresponded to a weight ratio of about 58.4 parts $SnO_2$ to 1 part Sb.

The calcined powder was formulated with a test paint carrier in the manner described in EPO '569, at a pigment/binder loading of about 32/100, and was applied to the test surface. The resulting dry paint film exhibited a surface conductivity of about 150 Ransburg units and a surface roughness of about 13 microinches.

EXAMPLE 2

This example describes a method for preparing a substantially white TECP comprising hollow amorphous silica shells coated with crystallites of antimony-containing tin oxide, wherein the weight ratio of $SnO_2$ to Sb in the coating was about 31 to 1. Such a weight ratio produces a powder having a relatively lower electrical resistance in comparison to the product formed substantially in accordance with Example 1.

$CaCO_3$ particles were coated with silica substantially in accordance with the method used in Example 1. The surface area of the resultant dry solids was about 13.3 $m^2/g$. Approximately three hundred and twenty four ml. of concentrated HCl was slowly added to an aqueous suspension of the particles in order to dissolve the $CaCO_3$ core material, while maintaining the pH at about 2.0. Removing the core material produced hollow silica shells.

Next, an aqueous solution comprising $SnCl_4$, $SbCl_3$ and HCl was prepared by combining approximately 400 ml of an aqueous $SnCl_4$ solution, which contained the equivalent of about 0.386 g $SnO_2$/ml, with about 14 ml of an aqueous concentrated HCl solution of $SbCl_3$, which contained the equivalent of about 0.267 g Sb/ml. The resultant solution had a ratio of about 41 parts by weight of $SnO_2$ to 1 part by weight of Sb.

Approximately one hundred ml of concentrated HCl was then added to the previously described solution for obtaining a pH between about −0.5 and about −1.0. The acid-containing solution was then added to the well agitated suspension of silica shell particles over a period of 2 hours, concurrently with the addition of sufficient quantity of 20% NaOH to maintain the pH of the suspension at 2.0. The suspension was then cured and the dry solids recovered, substantially as described in Example 1.

The surface area of the dried powder was about 156.4 $m^2/g$. The dried powder was calcined in air at a temperature of about 750° C. for about 2 hours. Approximately 181.5 grams of a white powder was recovered and the surface area was measured as being about 51.4 $m^2/g$. The dry powder resistance of the calcined powder was about 12 ohms. X-ray fluorescence analysis of the calcined powder indicated the presence of approximately 30.56% $SiO_2$; 66.8% $SnO_2$; 2.59% $Sb_2O_3$ and 0.06% $Fe_2O_3$, which corresponded to a weight ratio of about 30.9 $SnO_2$ to 1 part of Sb.

The powder was formulated with a test paint carrier comprising dry conductivity cells at a pigment/binder loading of about 20/100 and applied to a test surface comprising dry conductivity cells. The resulting dry paint film exhibited a surface conductivity in excess of about 165 Ransburg units, and a surface roughness of about 19 microinches.

EXAMPLE 3

This Example illustrates a method for determining the $L^*a^*b^*$ or reflectivity of an ECP as a function of whiteness.

The $L^*a^*b^*$ for an ECP produced substantially in accordance with Example 1 above was compared to 2 ECP products which were formed substantially in accordance with EPO '569, i.e., without using the reduced salt solution pH of the invention, namely the 10% and 5% Sb systems in the Table below.

The $L^*a^*b^*$ were measured by using a commercially available Hunter ColorQuest Colorimeter. The Colorimeter was operated using a D65 illuminant, and a 2 degree observer angle. The ECP samples were placed into a standard powder cell with a glass window. The values for the "L", "a", and "b" coordinates were recorded.

In order to calculate the whiteness of the sample, the recorded values of "L", "a", and "b" were used to determine a vector sum. The vector sum was determined by subtracting the value of "L" from 100, taking the square of this difference, and adding the squared difference to the squares of "a" and "b" to obtain sum total. The square root of the sum total was determined, and the value of the square root was subtracted from 100 in order to obtain the reflectivity or whiteness. The reflectivity is also known as the "$L^*a^*b^*$ distance from white" wherein pure white has a value of 100. A commercially available "white" tile was used for a standard reference for white or test control. The following Table sets forth the whiteness or $L^*a^*b^*$ for the certain ECPs that were produced substantially in accordance with Example 1 to the whiteness of an ECP product which was formed substantially in accordance with EPO '569.

TABLE

| ECP | L | a | b | $L^*a^*b^*$ Whiteness |
|---|---|---|---|---|
| Test Standard/White Tile | 94.84 | −1.03 | 0.47 | 94.72 |
| 10% $Sb_2O_3$ (based on $SnO_2$) | 76.36 | −4.53 | −0.54 | 75.96 |
| 1% $Sb_2O_3$ (based on $SnO_2$) | 89.40 | −2.17 | 3.02 | 88.77 |
| 5% $Sb_2O_3$ (based on $SnO_2$) | 81.05 | −0.366 | −1.43 | 80.65 |

Referring now to the FIGURE, the FIGURE graphically illustrates how the amount of antimony in the ECP effects the $L^*a^*b^*$. In particular, as the amount of antimony increases the $L^*a^*b^*$ or reflectivity of the powder decreases, and the presence of color increases. In FIG. 1, the ECPs produced substantially in accordance with Example 1 contained less than about 5% Sb, whereas the ECPs containing greater than about 5% were formed substantially in accordance with EPO '569.

Comparative Example 4

This is a comparative example that describes a process for preparing substantially white TECPs comprising hollow amorphous silica shells, which are coated with crystallites comprising antimony-containing tin oxide wherein the weight ratio of $SnO_2$ to Sb in the coating is about 45 to 1, that demonstrates the advantageous results achieved by using a reduce pH via concentrated acid addition.

In one case concentrated acid was not added to the $SnCl_4/SbCl_3$ solution prior to depositing antimony and tin compounds, and the resulting coating was substantially not electroconductive.

In the first case, into about three liters of deionized water, which had been heated to about 90° C. in a four liter beaker, was added with agitation about 1350 grams of $BaCO_3$ powder (supplied by the Kraft Co.). The pH of the resultant suspension was brought to about 10.0 by adding 20% NaOH. Approximately 600 ml. of a solution comprising $K_2SiO_3$ (which was obtained by mixing about 515 grams of Philadelphia Quartz Corp. #6 KSiL, which had a molar ratio $SiO_2/K_2O$ about 3.29, with about 600 ml of deionized water), was added to the previously described suspension at the rate of about 20 ml/min over a period of about half an hour. Approximately 620 ml of 10% HCl was then also added to the agitated suspension, while maintaining the temperature of the suspension at about 90° C., at a rate of about 3 to 4 ml/min over an approximately 3 hour period, thereby bringing the pH to about 7.0. The solids were recovered from the suspension by filtration, washed with deionized water until substantially free from chloride ions, and dried overnight at a temperature of about 120° C. The nitrogen surface area of the dried powder was about 3.1 m$^2$/g.

Approximately 250 grams of the dried powder was added to about 500 ml of deionized water within a Waring blender, and agitated for about two minutes. The resultant suspension was transferred to a two liter beaker, and the volume of the suspension was increased to about 1800 ml by adding deionized water. The suspension was heated to a temperature of about 90° C., and while agitating the suspension concentrated HCl was added dropwise to dissolve the BaCO$_3$ core material to form hollow silica shells. The pH of the suspension was stabilized at about 2.0.

An aqueous solution comprising SnCl$_4$/SbCl$_3$/HCl was then prepared by combining about 160 ml of an aqueous SnCl$_4$ solution, containing the equivalent of about 0.386 g/ml SnO$_2$, with about 4.5 ml of an aqueous concentrated HCl solution of SbCl$_3$, containing the equivalent of about 0.267 g/ml Sb, which corresponded to a ratio of about 51 parts by weight of SnO$_2$ to 1 part by weight of Sb. The resultant solution was then added to the previously described well agitated suspension of silica shells over a period of about 2 hours, while concurrently adding a sufficient quantity of 20% NaOH to maintain the pH of the suspension at about 2.0. The suspension was then agitated and cured by digesting for about half an hour at a pH of about 2.0, and a temperature of about 90° C.

The solids were recovered from the suspension by filtration, washed with deionized water until substantially free from chloride ions, and dried overnight at a temperature of about 120° C. Approximately 80.8 grams of a substantially pure white powder was recovered. The dried powder was ground using a mortar and pestle and about 10 grams of the ground powder was calcined in air at a temperature of about 750° C. for a period of about 2 hours. The nitrogen surface area of the calcined powder was determined to be about 39.2 m$^2$/g. The dry resistance of the calcined powder was about 2,106 ohms which indicates that this powder was substantially not electroconductive. X-ray fluorescence analysis indicated that the powder contained approximately, 38.2% SiO$_2$; 59.2% SnO$_2$; 1.6% Sb$_2$O$_3$; 0.06% CaO; 0.02% Fe$_2$O$_3$ and 1.2% BaO, which corresponded to a weight ratio of about 43.5 parts SnO$_2$ to 1 part Sb.

In the second case, the advantages of employing a relatively low pH were demonstrated. In the second case, approximately 250 grams of the silica shell particle suspension was treated with the SbCl$_4$/SbCl$_3$/HCl solution. The procedure and quantities of reactants were substantially the same as those described above in connection with the first case, with the difference that an additional 40 ml of concentrated HCl was added to the SnCl$_4$/SbCl$_3$/HCl solution to bring the pH below about $-0.5$. The coated silica shells were recovered, washed, dried, and calcined in the manner described above and corresponded to about 78.5 grams of a substantially pure white powder. The nitrogen surface area of a calcined powder was found to be about 38.2 m$^2$/g. The dry resistance of the calcined powder was about 60 ohms, which indicates that the powder formed in the second case possesses a resistance much lower than that of the powder made in the first case, i.e., without adding extra acid. As a result, the powder of the second case is acceptable for use an ECP. In particular, the process of the invention is capable of making white highly conductive ECPs having less than about 3% Sb, e.g., an ECP having a reflectivity greater than about 85%.

X-ray fluorescence analysis the second powder indicated that presence of approximately 31.25 SiO$_2$; 57.2% SnO$_2$; 1.5% Sb$_2$O$_3$; 0.05% CaO; 0.02% Fe$_2$O$_3$ and 1.2% BaO, which corresponded to a weight ratio of about 45.7 parts SnO$_2$ to 1 part Sb.

The second powder was formulated with a test paint carrier in the manner described in EPO '569, at a pigment to binder loading of about 32/100, and applied to the test surface. The resulting dry film exhibited a surface conductivity of about 165 Ransburg units.

Comparative Example 5

This comparative example illustrates the crystallite sizes of antimony-containing tin oxide crystallites on a silica surface which were formed by the present invention opposite crystallite sizes for precipitated ECPs. Without wishing to be bound by any theory of explanation, the crystallite size effects the electroconductivity of the ECP and, accordingly, an ECP having a relatively small crystallite size is desirable.

The antimony-containing tin oxide ECPs of the invention were formed substantially in accordance with Example 1, and the precipitated ECPs were formed substantially in accordance with the method described in EPO '569. The following Table illustrates ECP crystallite size in angstroms as a function of antimony content.

TABLE

| Sb wt. % (based on SnO$_2$) | ECP of the Invention | EPO '569 |
|---|---|---|
| 0 | 95 A | 438 A |
| 1 | 77 | 380 |
| 2.5 | 85 | 295 |
| 5.0 | 75 | 184 |
| 10.0 | 75 | 116 |

The above Table illustrates that the invention can produce ECPs having crystallites several times smaller than ECPs formed by precipitation. The crystallite size of the present ECPs is also not as dramatically effected by the quantity of antimony. As a result, the invention is capable of obtaining ECPs which have relatively small crystallites while reducing the quantity of antimony that is present in the ECP.

While a few aspects of the invention have been described in detail one of ordinary skill would recognize that other aspects or embodiments and variations are encompassed by the appended claims.

The following is claimed:

1. A method for making an electroconductive powder composition comprising an amorphous silica shell or an amorphous silica coated particle in association with a surface coating comprising a conducting network of antimony-containing tin oxide crystallites, said method comprises the steps of:
   (a) providing an aqueous suspension comprising a particulate substrate;
   (b) preparing separate aqueous solutions comprising hydrolyzable tetravalent tin and trivalent antimony salts, optionally adding at least one cation selected from Groups IA, IIA and IIIA;
   (c) combining the tin and antimony salt solutions, and adjusting the pH of the combined solution to about $-0.5$;

(d) applying a coating layer comprising hydrous oxides of antimony and tin onto the substrate surface of said particulate substrate by adding the combined salt solution to the suspension;

(e) recovering solids from step (d), optionally washing the recovered solids substantially free from water soluble species and drying; and (f) calcining the recovered solids thereby obtaining said powder composition, wherein the quantity of antimony in said powder composition is less than about 3 weight % based upon tin oxide.

2. A method for making a substantially white electroconductive powder composition comprising at least one substrate particle in association with a surface coating comprising antimony-containing tin oxide crystallites, said method comprises the steps of:

(a) providing an aqueous suspension comprising a particulate substrate, (b) preparing an aqueous solution comprising a source of antimony and tin, optionally adding at least one cation selected from Groups IA, IIA and IIIA;

(c) adjusting the pH of said solution to be less than about −0.5, (d) applying a coating layer comprising hydrous oxides of antimony and tin onto the substrate surface of said particulate substrate by adding the solution to the suspension;

(e) recovering solids from step (d), and;

(f) heating the recovered solids at a temperature and for a time sufficient to form said powder composition, wherein the quantity of antimony in said powder composition is less than about 3 weight % based upon tin oxide.

3. The method of claim 1 or 2, wherein the substrate particles comprise at least one member selected from the group consisting of silica coated oxides of; titanium, magnesium, calcium, barium, strontium, zinc, tin, nickel and iron; mica, cordierite, enorthite and pyrophyllite; carbonates and sulfates of calcium, barium and strontium, and mixtures thereof.

4. The method of claim 1, wherein
step (d) further comprises adding the combined solution of tin and antimony salts to a suspension comprising said substrate, wherein said substrates comprises particles having an amorphous silica surface; while maintaining the pH of the suspension in the range of about 1.5 to 3.5 and the temperature of the suspension in the range of from about 25° to 100° C. and maintaining the aqueous suspension at about 25° to 100° C. with continuous agitation over a period of about 30 to 60 minutes; and depositing a substantially uniform layer of antimony-containing tin oxide crystallites about 5 to about 20 nm thick;

step (e) further comprises recovering the solids, washing the recovered solids substantially free from chloride ions, and drying the washed product, and;

step (f) further comprises calcining the washed product at a temperature of about 550° to about 900° C., for at least one hour.

5. The method of claim 1 or 2, wherein the substrate particles comprise hollow shells of amorphous silica.

6. The method of claim 1 or 2, wherein the substrate particles comprise amorphous silica coated titanium dioxide.

7. The method of claim 1 or 2, wherein the substrate particles comprise amorphous silica coated mica.

8. The method of claim 1 or 2, wherein the powder composition comprises
antimony-containing tin oxide crystallites in association with a substrate particle, and said powder has a reflectance greater than about 82%.

9. The method of claim 8, wherein the powder composition has a dry powder resistance of less than about 2,000 ohms.

* * * * *